United States Patent [19]
Ebrahim

[11] Patent Number: 5,859,639
[45] Date of Patent: Jan. 12, 1999

[54] MECHANISM TO CONTROL VISIBLE PRESENCE OF DESKTOP OBJECTS IN A GRAPHICAL USER INTERFACE

[75] Inventor: Peter Agha Ebrahim, Mannheim, Germany

[73] Assignee: International Business Machines Corporation, Armonk, N.Y.

[21] Appl. No.: 723,173

[22] Filed: Sep. 30, 1996

[30] Foreign Application Priority Data

Jul. 17, 1996 [EP] European Pat. Off. ............ 96 111 506

[51] Int. Cl.$^6$ ...................................................... G06F 3/14
[52] U.S. Cl. .......................... 345/345; 345/344; 345/340; 345/977
[58] Field of Search ..................................... 345/340, 341, 345/342, 343, 344, 345

[56] References Cited

U.S. PATENT DOCUMENTS

| | | | |
|---|---|---|---|
| 4,819,189 | 4/1989 | Kikuchi et al. | 345/345 |
| 5,060,170 | 10/1991 | Bourgeois et al. | 345/342 |
| 5,179,655 | 1/1993 | Noguchi et al. | 345/345 |
| 5,390,295 | 2/1995 | Bates et al. | 345/345 |
| 5,487,143 | 1/1996 | Southgate | 345/342 |
| 5,644,737 | 7/1997 | Tunimon et al. | 345/352 |

FOREIGN PATENT DOCUMENTS

| | | |
|---|---|---|
| 0583206A | 2/1994 | European Pat. Off. . |
| 04152424A | 5/1992 | Japan . |
| 08 147133 A | 6/1996 | Japan . |

OTHER PUBLICATIONS

IBM Technical Disclosure Bulletin, vol. 29, No. 10, Mar. 1987, "Method for Keeping Windows from Overlaying Important Information".
IBM Technical Disclosure Bulletin, vol. 35, No. 6, Nov. 1992, "Method for Automatic Presentation Shift Change".
Research Disclosure (2244), Emsworth, GB, May 1993, No. 349, "Method for Preventing Overlayed Objects".
IBM Technical Disclosure Bulletin, vol. 35, No. 6, Nov. 1992, "Icon Safe Zone".
IBM Technical Disclosure Bulletin, vol. 36, No. 06A, Jun. 1993, "Translucent Window Attribute".
IBM Technical Disclosure Bulletin, vol. 36, No. 08, Aug. 1993, "Roving Title Bar".
IBM Technical Disclosure Bulletin, vol. 37, No. 01, Jan. 1994, "Desktop Rearrangement Based on Incoming Calls".
International Technology Disclosures, R.G. Hillis, P.L. McCurdy, and C.A. Schreiber, "Icon Park", vol. 9, No. 11, Nov., 1991.
Research Disclosure, Kenneth Mason Publications, Ltd., J.E. Doran and G.A. Koets, "Hidden Icon Notification", No. 312, Apr. 1990.

*Primary Examiner*—Raymond J. Bayerl
*Assistant Examiner*—Chadwick A. Jackson
*Attorney, Agent, or Firm*—Diana L. Roberts; Lisa B. Yociss; Andrew J. Dillon

[57] ABSTRACT

Disclosed is a mechanism to control presentation of visible desktop objects in a graphical user interface (GUI). It is particularly related to a scenario where application windows are masking icons with regard to a window overlaying technique. The concept of the invention is to move hidden icons or windows to visible locations of the desktop when they are obscured by other windows, or other desktop objects like icons themselves. Desktop objects which are provided with the above presence functionality regularly call up a routine which compares the actual positions of all windows or other desktop objects with the own location. Calling-up can be initiated also by changes of the desktop contents. If an icon is covered by an other object, it determines a visible target location and will be presented at the new position. The motion of a desktop object can be performed without need of any interaction by the user. Therefore, this mechanism enables a very intuitive comprehensible solution of the above problems.

14 Claims, 11 Drawing Sheets

MECHANISM TO CONTROL VISIBLE PRESENCE OF DESKTOP OBJECTS IN A GRAPHICAL USER INTERFACE

FIELD OF THE INVENTION

The invention pertains to presentation of visible desktop objects in a graphical user interface (GUI). It concerns GUIs which utilize viewports for presentation of application programs being in a user's current focus, and so-called "icons" for presentation of application programs currently being out of the user's focus, or for presentation of mere data objects, respectively. It is particularly related to a scenario where active application windows are masking icons or other non-active windows with regard to a window overlaying technique.

BACKGROUND INFORMATION AND DESCRIPTION OF THE RELATED ART

Operating systems like OS/2, Windows95 or MacOS (registered trademarks by IBM Corp., Microsoft Corp. and Apple Computer Inc., respectively) commonly provide a virtual electronic desktop as a human-machine interface. Application programs running under those operating systems and respective data resources are represented as desktop objects, where inactive desktop objects (icons) can be activated by use of a pointer device (mouse pointer) and hereby change into active objects usually represented by application windows (window sessions). In those windows the operations and processes of according application programs are performed.

This GUI concept causes the problem that, when a user's desktop becomes busy and cluttered with multiple icons and windows, the lack of available screen makes it very difficult to navigate between various sessions represented by those icons or windows, because often one or more windows or icons cover one or more icons which are then hidden beneath those windows or icons, respectively. A common way for finding an application window that is not clearly visible, or activating such "hidden" icons, by use of a mouse pointer, is to rearrange the position of a covering window, or to minimize that window to an icon.

Thereupon, generic operating systems commonly provide a mechanism to bring an icon to focus by positioning the mouse pointer on the icon and clicking on the mouse select button. Often times, users have a plurality of icons (containers) on their desktop whereby some are viewable and some are obstructed. Therefore users must manually rearrange the position of the icons to view a related set of icons. This can be a tedious job when many icons are on the desktop and some are obstructed by others. In an article by A. Salahshour and M. Williams, published in IBM Technical Disclosure Bulletin, vol. 37, no. 1, January 1994, pages 657–658, a respective desktop rearrangement methodology, based on incoming calls for desktop objects, is proposed. A described control mechanism detects an incoming call and automatically surfaces the icons and windows associated to that call. Further to maximize the usage of the viewing display area, the icons and windows are rearranged and re-sized to best fit the display area.

In addition, there exist more adequate approaches for solving the above problem. Some of the known desktop systems like the Presentation Manager (PM) under OS/2 provide a so-called "launchpad" usually comprising smaller icons from which frequently used desktop objects can be activated. Those launchpads have a "float on top" functionality which ensures that they are always visible and can not be masked by an application window. This approach has the disadvantage that the viewport for an active application program is reduced by the permanent visibility of the launchpad. Beyond that such a static solution is less flexible i.e. allows only small adaptations of the desktop, and is only a very reduced representation of a real (physical) desktop. Further that static approach does not allow a full-screen view of a window with a high priority for visibility.

Another approach enables activation of an application program by a specific combination of key strokes or mouse operations. For instance, OS/2 provides a general-purpose window ("icon park") for displaying icons which are currently active. In the icon park all icons can be visualized whether the window itself is visible or not. The icon park is a functional window that can be moved, scrolled and re-sized. In particular, the icon park has the capability to re-surface an open but hidden window from the background screen. More detailed information about the icon park concept is contained in an article by R. Hillis et al. published in IBM Technical Disclosure Bulletin, vol. 9, no. 11, Nov. 1991, entitled "Icon Park".

There exist a number of solutions specifically concerning the problem of hidden windows. A first approach is disclosed in U.S. application for Ser. No. 923,698 (IBM docketno. DA992016) assigned to the present assignee and entitled "Method of and Apparatus for Providing Navigation to a Hidden Desktop Window". Hereby a user is provided a capability to automatically pop into the foreground of the desktop a hidden window or a plurality of hidden windows. The selection of which hidden window to pop into the foreground is based on a priority queue which may depend on the area of a window covered by other windows and/or the number of other windows covering a window.

A second approach, a method and system which allow to identify a window on the desktop even when the title bar and list objects are covered up by other windows, is disclosed in a publication by W. Johnson and O. Weber published in IBM Technical Disclosure Bulletin, vol. 36, no. 8, Aug. 1993, pages 143–144. The system causes the title bar of a hidden window to move to another position on that window which is still visible to the user. Further, when only the title bar is masked by another window, the title bar is repositioned at a visible portion of that partially hidden window.

A further method to reveal hidden icons which are displayed within a viewport (window) and obscured behind other windows is disclosed in U.S. application for Ser. No. 703,434 (IBM docketno. DA991001) assigned to the present assignee and entitled "Method to Reveal Hidden Target Objects During Graphic User Interface Drag and Drop Operations". That approach is particularly related to a drag and drop scenario where an icon shall be moved from one (source) viewport to another (target) viewport, wherein the target viewport is not visible since being hidden by another viewport, for example the source viewport. Hereby it is particularly assumed that one of a set of selectable visual icons is to be relocated to an exposed portion of the target viewport. That movement between the viewports triggers an automatic rearranging of the order in which the viewports overlap, causing the target viewport to be raised to a topmost position relative to all the other viewports.

An alternative solution for the problem of icons hidden by windows is disclosed in an article by G. Fitzpatrick et al. published in IBM Technical Disclosure Bulletin vol 36, no. 6A, June 1993, pages 135–136. The authors propose a so-called "Translucent Window Attribute" where a translucent window allows objects immediately below it to show through. Hereby confusion and screen clutter of a busy desktop can be minimized.

A so-called "Icon Safe Zone" approach is disclosed in an article by L. Cahill et al. published in IBM Technical Disclosure Bulletin no. 6, Nov. 1992, pages 34–35. This safe zone is visually differentiated from the rest of the desktop through the use of shading which, for instance, can be displayed at the bottom of the desktop, wherein a user can decide which icons, e.g. those he works with the most, are placed in that safe zone. Those icons are protected from being covered by other windows.

A kind of "ghost icon" approach is disclosed in an article by J. Doran and G. Koets published in IBM Research Disclosure no. 312, April 1990 and entitled "Hidden Icon Notification". According to that approach, icons are shown briefly in a faded manner which does not obstruct the view of the current window but still can inform the user of an icon change. The proposed method allows a user to communicate with an icon hidden beneath a window although being covered.

A more particular solution concerning mobile trainable icons is disclosed in U.S. application for Ser. No. 227,149 (IBM docketno. Y0993077) assigned to the present assignee and entitled "A Method and System for Facilitating the Selection of Icons". It is proposed that those icons which are next likely to be used are selected and automatically moved towards a cursor thereby facilitating selection of the icons. The likeliness that one or more icons will be used within a predefined amount of time is determined. The appearance of those icons determined not likely to be used within that time is gradually changed. Additionally, those icons likely to be used, or other icons selected by a user, may track the cursor such that those icons are always close to the cursor and capable of being easily selected. In addition, it is possible to reduce the amount of clutter on a computer display so that icons may be easily selected. In order to clean up the computer display, icons which are least likely to be used are faded, eliminated or shrunk to a smaller size. The above approaches all have the drawback of troublesome operability and a missing realization of a virtual desktop and its desktop objects which normally can be activated by simple mouse operations.

The objective of the present invention, therefore, is to provide a mechanism to control visibility of icons in a viewport (window) environment, which allows improved visibility of icons and windows and simple and user-friendly adaptation like on a real desktop. Further the mechanism should re-organize the desktop of the GUI automatically with respect to a changing windows environment.

The underlying concept of the present invention, to solve the above objective, is that desktop objects, i.e. icons or windows, are moving to visible locations of the desktop when they are obscured by active (opened) windows which usually are a user's current focus, or other desktop objects like icons themselves. That motion can be advantageously performed without need of any interaction by the user. The proposed basic functionality can be arbitrarily adapted to different technical requirements of the GUI desktop or needs of the respective user of the GUI. In particular the invention is a very intuitive comprehensible solution of the above problems.

It is emphasized that a user's current focus on an application (program) is not restricted with regard to "opened" or "closed" viewports since icons can also be active programs running in the background, and thus an application currently focussed by a user is not only characterized by its active or non-active state.

In a first embodiment of the invention desktop objects which are provided with the above functionality regularly call up a routine which compares the actual positions of all windows or other desktop objects with the own location. Calling-up can be initiated also by changes of the desktop contents. If an icon is covered by an other object, it determines a visible target location and will be presented at the new position. A particular advantage of the proposed concept is that the development tools, programming languages and system interfaces required for implementation of the proposed mechanism are already provided by known operating systems which support mouse pointers together with windows-oriented desktop objects.

In a further embodiment of the mechanism according to the invention the user equips multiple desktop objects with self-controlling presence (visibility) functionality by use of a common "notebook" which is already provided for example by OS/2 for configuration of objects. In such a notebook the user can also activate or inactivate the presence functionality for one or more objects.

In another embodiment, the direction of motion of the objects can be controlled by priority. For instance, the desktop can be partitioned into a number (e.g. 4) quadrants each of which having assigned a different weight by the user. If a self-controlled icon is covered by an other object, it first will try to be presented at a visible portion of the desktop corresponding to a quadrant with the largest weight. The order for selecting a visible portion of the desktop can also be controlled by points of the compass or clockwise direction.

According to a further embodiment of the invention the motion of the icons can be adjusted with respect to the habit of the respective user and with respect to a most clearly arranged desktop. For instance, moving objects can be presented discreet with regard to shape, brightness or contrast of non-moved objects in order not to irritate the user who is busy with an active window. The motion of icons can also be presented invisible to the user wherein moved icons only appear at the target location.

Furthermore, the user is free in configuration of the behavior of desktop objects after close of a previously masking window. Hereby the following rules can be implemented:

The "moved" object remains at the target position; the moved object appears at the origin position which becomes visible again due to the close of the window;

the object has not really "moved" to the target position, but only a copy of that object was generated at a visible portion of the desktop, wherein after close of the window the origin object as well as the copy are presented, or only the copy is discarded.

The essential features of the invention will now be explained through the embodiment examples in the following illustrations, and within the framework of a comparison with the relevant state of the art.

SUMMARY OF THE INVENTION

Disclosed is a mechanism to control presentation of visible desktop objects in a graphical user interface (GUI). It is particularly related to a scenario where application windows are masking icons with regard to a window overlaying technique. Known GUI concepts have the disadvantage that, when a user's desktop becomes busy and cluttered with multiple icons and windows, the lack of available screen makes it very difficult to navigate between various sessions and windows because often one or more windows cover one or more icons which are hidden beneath those windows. The concept of the invention is to move hidden icons or windows to visible locations of the desktop when they are obscured by other windows, or other desktop objects like icons themselves. Desktop objects which are provided with the above presence functionality regularly call up a routine which compares the actual positions of all windows or other desktop objects with the own location. Calling-up can be initiated also by changes of the desktop contents. If an icon is covered by an other object, it determines a visible target location and will be presented at the new position. A particular advantage of the proposed concept is that the development tools, programming languages and system interfaces required for implementation of the proposed mechanism are already provided by known operating systems. The motion of a desktop object can be performed without need of any interaction by the user. Therefore, this mechanism enables a very intuitive comprehensible solution of the above problems.

DETAILED DESCRIPTION OF THE PREFERRED EMBODIMENT

Figure 1:
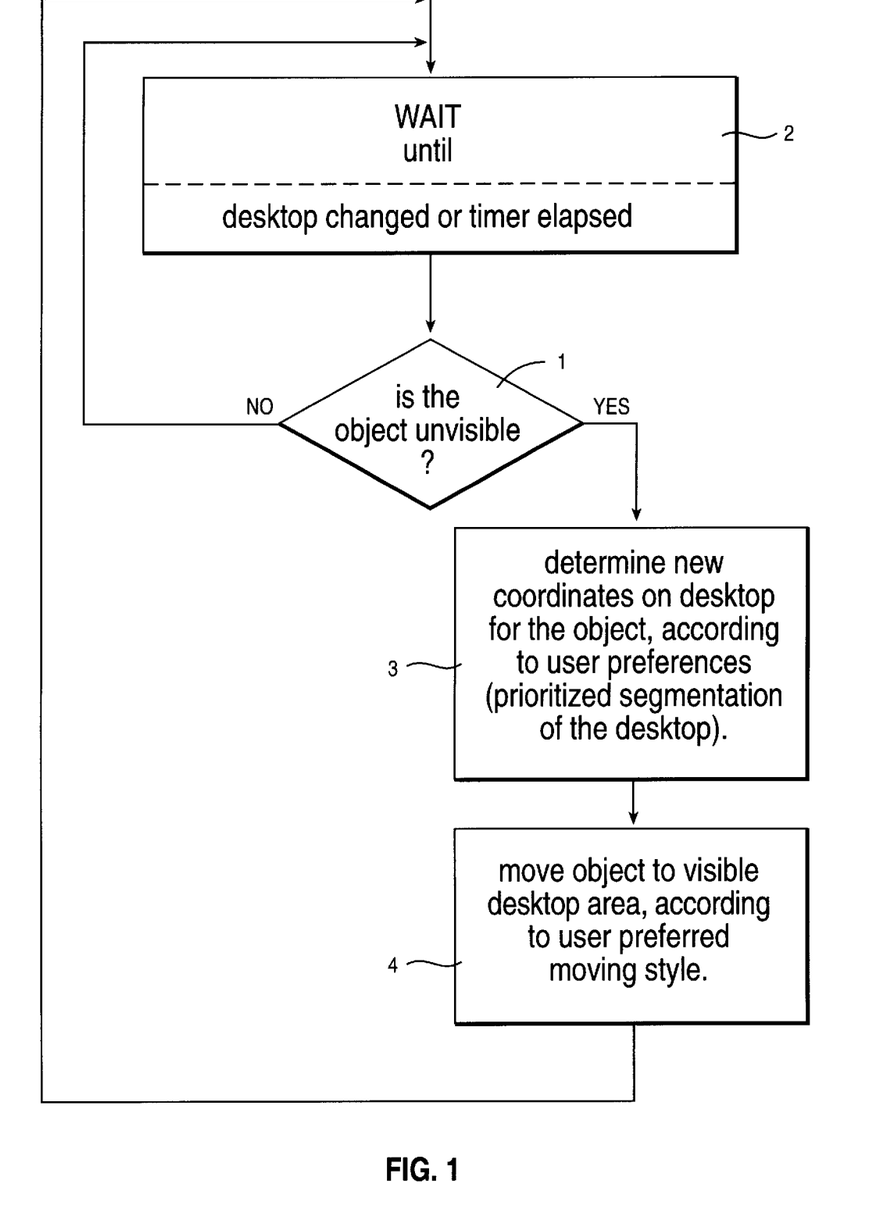
FIG. 1 is a flow chart diagram depicting the principle control mechanism for presentation of visually hidden icons (inactive desktop objects) in a graphical user interface (GUI) according to the invention.

Referring to FIG. 1, the control mechanism proposed by the invention is illustrated by way of a flow chart diagram where the necessary control steps for determination of a hidden state of an icon and for a non-hidden presentation of such an icon is shown. That control mechanism can be performed, for instance, by a supervisor control program running on an operating system level. An alternative way of implementation and configuration of the control mechanism by a user is use of existing functionality provided by operating systems like OS/2 for the configuration of desktop (window) objects. Such an implementation is described below in more detail.

The control mechanism involves a step of determining 1 hidden states of the icons on the desktop, i.e. their visibility on the desktop, wherein an activation of that mechanism, in a first embodiment, can be triggered periodically dependent on a "timer elapsed" signal. That signal can be delivered by an internal timer routine, e.g. a wait loop 2, which can be provided by the operating system or can be implemented as a separate application program. In another embodiment the control mechanism can be triggered by current changes of the desktop contents i.e. on an event basis 2.

In case of a hidden icon, the next step is determining 3 a non-hidden portion of the desktop where the hidden icon can be presented non-masked. Hereby a user can configure the details of that search. For example, in case of a priority-controlled segmentation of the desktop, the user can determine the sequence of how the desktop segments are checked for availability to allow a non-hidden presentation of the icon. In case of such a visible desktop area being found, the next step is visibly presenting 4 the icon at the new desktop area.

Concerning the details of the new presentation of an icon, multiple embodiments are suitable. In a first embodiment the icon can be presented immediately, e.g. as a copy of the original hidden icon, or as a moved original icon. In another embodiment, the movement of the icon to the new presentation area can be visualized by means of displaying a continuous moving trace or displaying a shorter trace like a tail of a comet. Beyond that the moving trace can be displayed in a more discreet manner by means of shading. The moving style can be configured by the user individually for each icon or jointly for all the icons. Besides the herein disclosed embodiments, a variety of other implementations of the proposed control mechanism are possible.

Figure 2:
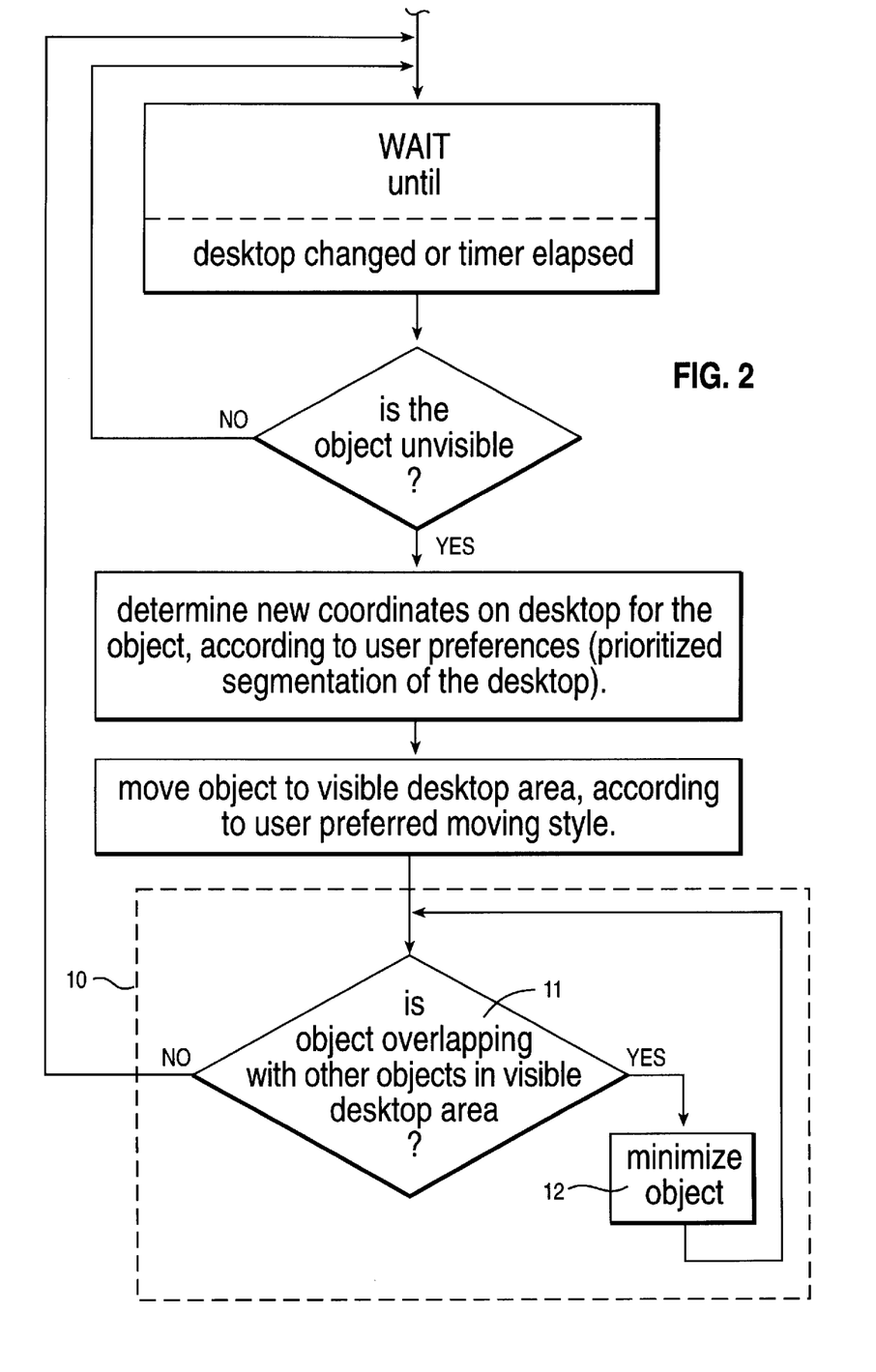
FIG. 2 is a flow chart diagram as in FIG. 1, but with an additional functionality for adapting the desktop object's size to the available desktop space of the GUI.

FIG. 2 includes a further functionality 10 through which icons can be scaled down in size if the visible portion of the desktop is not sufficient for presentation of all icons. The necessary step is to check out 11 whether icons are overlapping with other icons or windows (partially hidden desktop objects) within the destination area for a new presentation of the "moved" icon. In case of overlapping desktop objects, the size of each icon displayed at the respective portion of the desktop is reduced 12 in order to enable presentation of all icons without overlaps. Hereby the sizes can be changed jointly or individually for each or some of the icons.

For an implementation of the control mechanism under the Presentation Manager (PM) of OS/2 existing information and functionality can be utilized as will be illustrated now. First some principles of PM which provide information and functionalities to implement the described invention are summarized:

PM creates at start-up a window known as the desktop window or "workplace". This desktop window serves as base window for all applications and as the parent of all top-level windows. To perform functions with the desktop window a predefined identifier HWND_DESKTOP can be used or the WinQueryDesktop Window API (Application Program Interface) can be queried as follows:

HAB hab: /*Anchor-block handle*/HDC hdc: /*Device-context handle*/HWND hwndDeskTop: /Desktop-window handle*/HWND hwndDeskTop=WinQuery Desktop Window (hab, hdc);

Other useful API functions (without parameters) for the implementation of the invention under OS/2 are:

WinQueryActiveWindow
/*This function obtains the handle to the active window*/

WinBeginEnum Windows
/*This function begins the enumeration process for all of the immediate child windows of a specified window. (WinEndEnum Windows ends the enumeration)*/

WinQueryWindowPos
/*this function queries the window size and position of a visible window*/

WinSetWindowPos
/*This function allows the general positioning of a window*/

WinQueryWindowRect
/*This function returns a window rectangle*/

WinIsWindowShowing
/*This function determines whether any part of the specified window is physically visible*/
WinWindowFromPoint
/*This function finds the window below a specified point [or returns NULL on failure!]*/

It is noteworthy that an icon is defined as a minimized window and thus particularly can be moved like a window. Therefore all the above and the following functions can be performed on icons too. By means of the above API functions the PM can be programmed by the user. Similar functions are also provided by other operating systems like Microsoft Windows (registered trademark by Microsoft Corp.). The PM counterpart under Windows is a so-called Desktop Manager.

Further the current minimized or maximized state of a window can be retrieved by checking the window style parameter by use of an API function WinQueryWindowUlong as follows:

ULONG ulStyle;
ulStyle=WinQueryWindowUlong (hwndwindow, QWL_STYLE);
BOOL bisicon=ulstyle & WS_MINIMIZED;
BOOL bisMaximized=ulStyle & WS_MAXIMIZED;

OS/2 as a multitasking operating system thereupon provides messages and message queues for desktop objects. Related to the invention PM generates the following useful messages:

WM_SIZE
/*Sent if the size of the window has changed, after the change has been made. This message specifies both the old and new window size*/
WM_MOVE
/*Sent when a window moves its absolute position*/.

There are several possibilities to realize the described functionality of the invention. A very efficient implementation is the maintaining of a globally accessible 2-dimensional array which contains the coordinates of all visible windows (including minimized windows=icons). With this method only one background process is necessary for the whole desktop.

The process initializes and updates the entries of the array. For the updating the process only needs to filter the PM message queue for WM_SIZE and WM_MOVE messages. The next step is to detect a violation of the visibility state of the windows marked "present". This can be accomplished by performing a numeric algorithm on the data array which detects the overlapping of borderlines in a set of 2-dimensional fields. Those algorithms are well-known in that field of 2-dimensional arithmetic.

In contrast to the above 2-dimensional calculations, a much easier way to detect overlapping is the using of a further OS/2 API query named WinIsWindowShowing. In this case the condition for the visibility is very weak since WinIsWindowShowing returns a logical false only in case of full overlapping. In the same manner the coordinates of free areas is determined, and if necessary one or a several icons are moved (using WinSetwindowPos). It is possible to move and size the window in a single call (when a minimization is necessary). As an example, to move a window to position (10,10) and to change the size to 75 pels by 50 pels the following call can be performed:

WinSetWindowPos (hwndwindow, 0 L, 10 L, 10 L, 75 L, 50L, SWP_MOVE|SWP_SIZE);

In the precited operating systems this function is available for windows in general. Alternatively, icons can be sized with the following method. For each (maximized) window several icon bitmaps in different sizes (and designs, if desired) are hold. Depending on the available desktop area the bitmap with the best size can be used to represent a minimized window as icon.

The following exemplary code represents a recursive procedure that can be used to initialize an array which contains the positions of all visible windows on the desktop.

```
#define INCL_WINWINDOWMGR/*WindowManager
  Functions*/#include <os2.h>
VOID EnumerateImmediateChilds (HWND hwndParent)
  /*hwndParent: Handle of the window whose child
    windows are to be enumerated*/{HWND hwndChild;
  /*current enumeration handle*/HENUM henum;
  /*enumeration handle*/SWP swp; /*SWP-structure,
    containing window's size, position and state)*/henum=
    WinBeginEnumwindows(hwndParent);
while ((hwndChild=WinGetNextWindow(henum))!=
  NULLHANDLE){ . . . /*Determine window position
    and size*/WinQueryWindowPos(hwndChild,
    &swp) . . . /*add current window data to global
    array*/AddData to Array(hwndChild, swp);/*user-
    defined function*/ . . .
  EnumerateImmediateChilds(hwndChild); /*recursive call
    to detectall windows*/ . . . }
WinEndEnumWindows(henum);
return;
```

To enumerate and determine all windows in the system (taking a snapshot of the desktop) this procedure must be called with HWND_DESKTOP, i.e. EnumerateImmediateChilds(HWND_DESKTOP). That call-up provides for all windows the respective "handle" i.e. the sought data. The inner "while" loop of the above procedure is executed for each window of the desktop. The function WinGetNextWindow(henum) provides all child windows of a parent window and is recursive insofar as child windows themselves can have "children" again. The parent window can be represented by the desktop (window) itself.

For all icons for which the presence functionality according to the invention is provided, the above depicted procedure needs only one process running in the background, i.e. one process for one desktop. As an alternative embodiment of the invention, one process per icon can be implemented where multiple processes of the same kind have to be run in parallel in the background. In that fully object-oriented implementation, the above procedure is performed independently by each icon what is advantageous insofar as the described functionality belongs to each icon. Thereupon other properties of object-oriented technology like "inheritance" can be advantageously used.

A further approach—instead of an implementation based on existing functionality of the underlying operating system—is to implement a separate application program which includes the beforehand discussed concepts with regard to the array approach.

Figure 3:
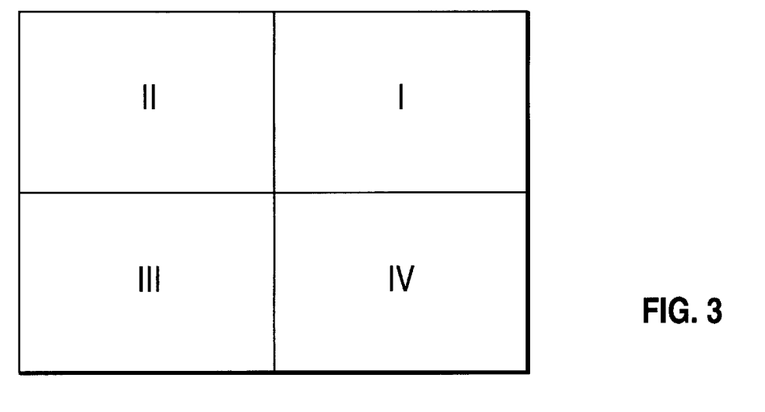
FIGS. 3–5 show different embodiments for segmentation of the display screen of the GUI for presentation of visually hidden icons.
Figure 4:
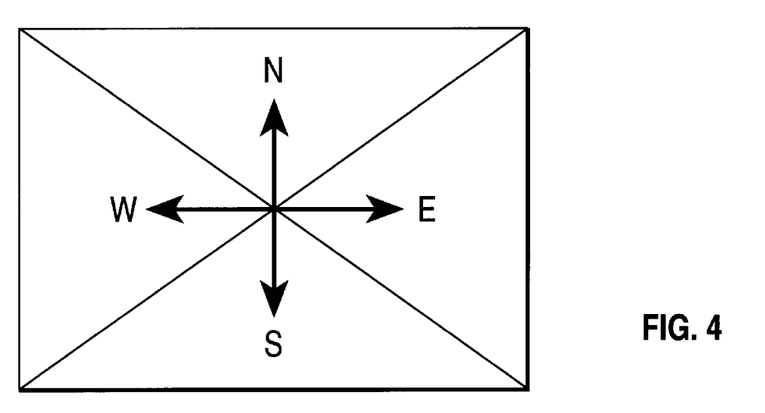
Figure 5:
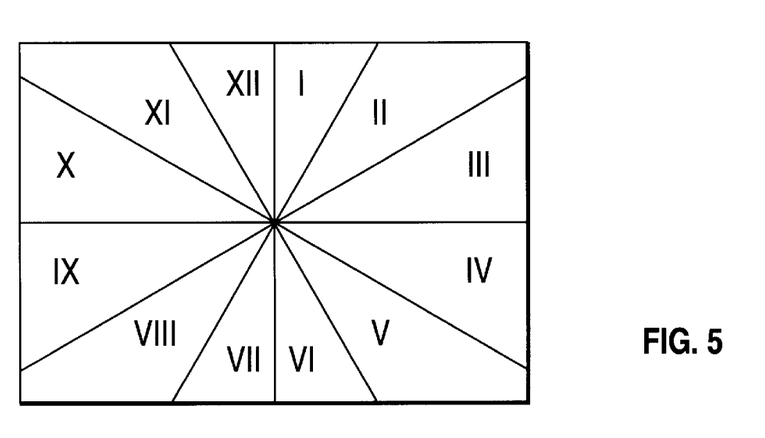

Furthermore as described above, the "moving" behavior of icons according to the invention can be configured, for instance with respect to the working habits of the user of the GUI. In a preferred embodiment the desktop is segmented into multiple partitions each of them having assigned a different priority to become a target portion of the desktop for displaying a previously hidden icon, or several hidden icons, respectively. Various embodiments for segmentation of the desktop are suitable and FIGS. 3–5 depict only preferred embodiments. In FIG. 3 the desktop is subdivided into four quadrants wherein the priority of each quadrant to become the destination area is controlled by a clockwise priority chain. In FIG. 4 the desktop is segmented into four quadrants which are aligned to the points of a compass. In a further embodiment according to FIG. 5 the segmentation is accomplished similar to a clock-face.

Figure 6:
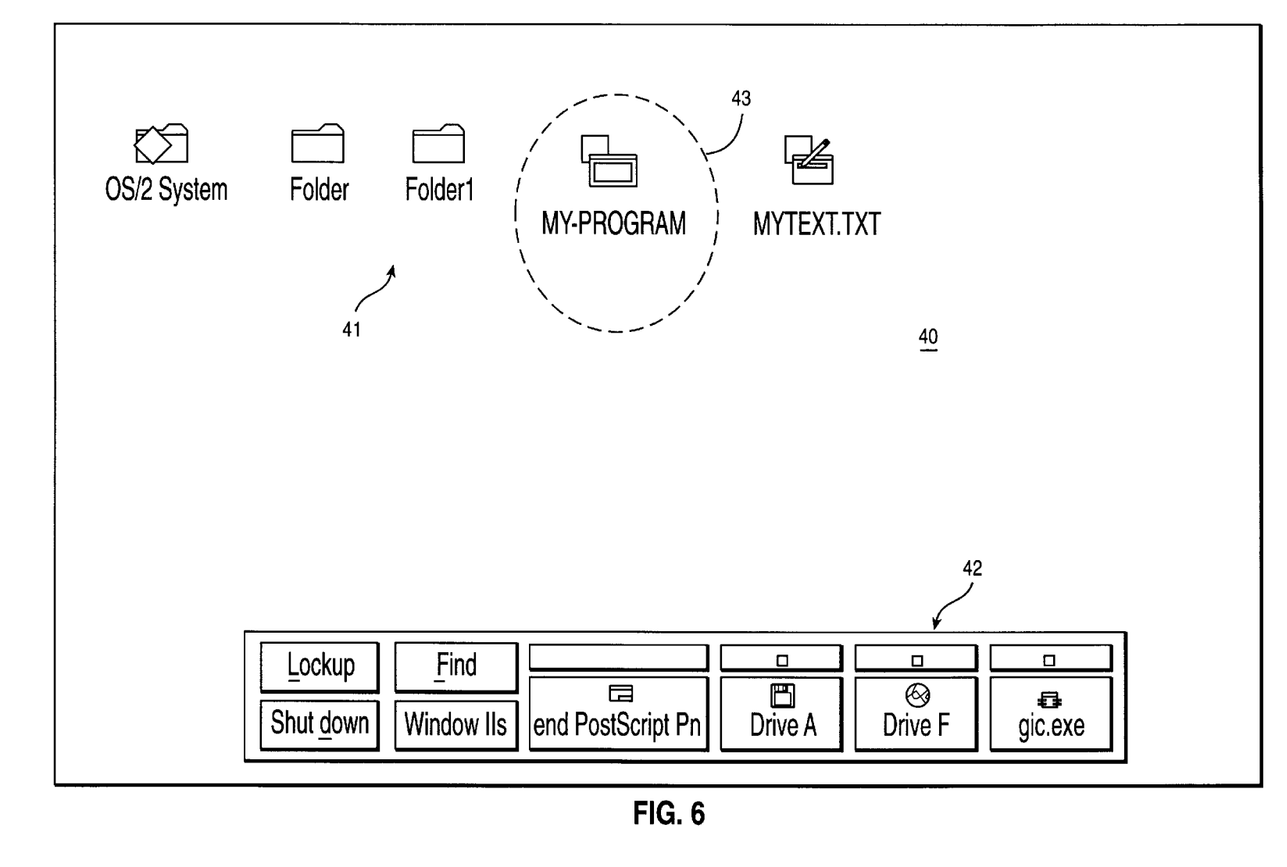
FIGS. 6–13 are typical display screen shots for a common scenario in a GUI concurrently displaying several icons and application windows, illustrating the benefits through use of the invention vis-a-vis prior art approaches.

The screenshots shown in FIGS. 6–13 show typical situations of a GUI desktop where the invention can be advantageously applied. In FIG. 6 on top of a desktop screen 40 a number of icons 41 is visible. In order to set the advantages of the invention against prior art solutions, at the bottom of the desktop screen 40 a launchpad 42 is displayed where frequently used icons i.e. application programs can be picked up as reduced icons.

Figure 7:
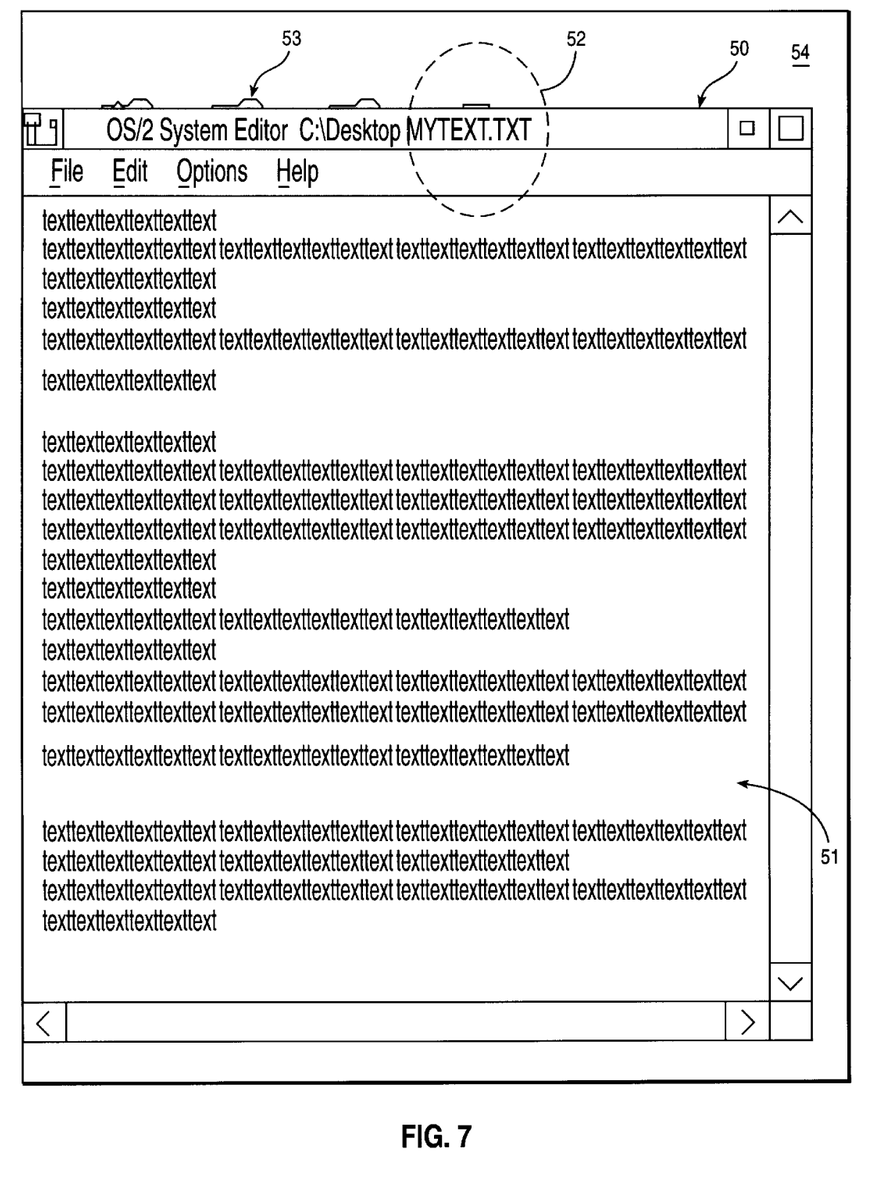
Figure 8:
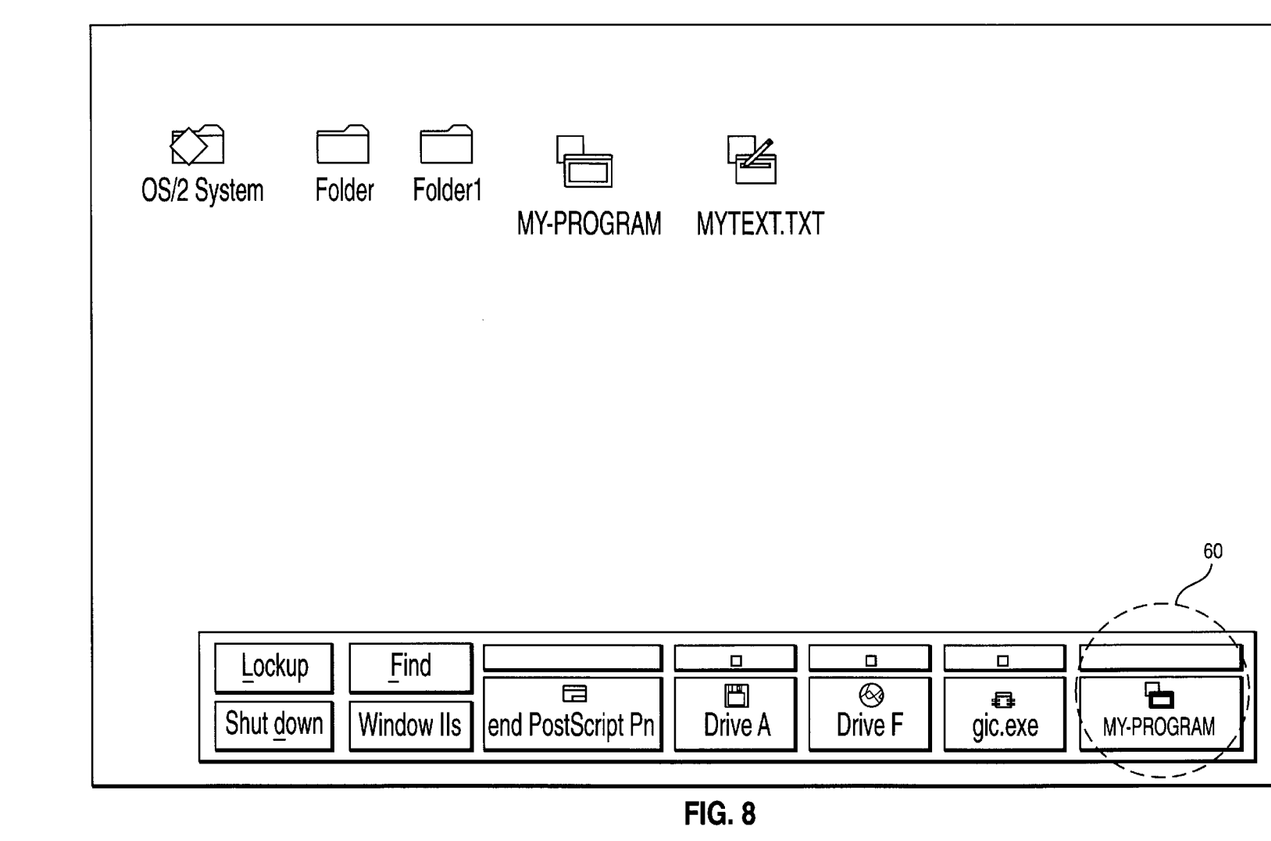
Figure 9:
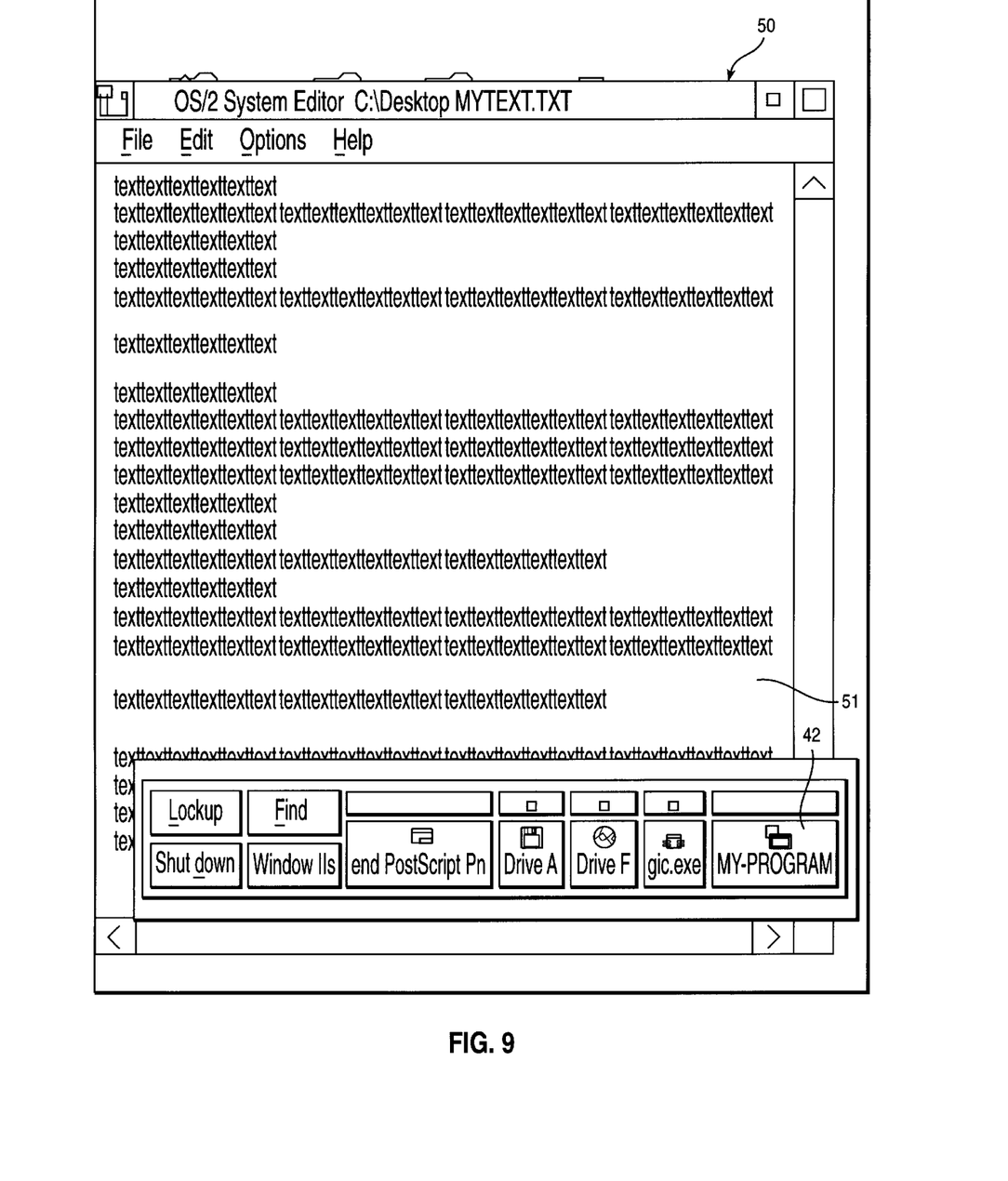

It is now assumed that an application program like that represented by the icon "MYTEXT.TXT" is called up by applying the mouse pointer to that icon, which thus becomes the user's current focus. By calling up the text file "MYTEXT", according to the principles of object-oriented technology, a respective system editor is started which enables to edit in that text file. The editor 50 displaying the text file 51 is shown in FIG. 7. The text file 51 is indicated at the title bar of the editor 50. As can be seen at the top left side of the desktop 54, the icons displayed at the top left side of in FIG. 6, in particular the icon for the application program "MY-PROGRAM" 52, are now hidden beneath the application window of the editor 50.

In particular the icon "MY-PROGRAM" is obstructed and can not be called up immediately. As described with regard to FIG. 8, according to a known approach, the icon representing the program "MY-PROGRAM" 60 can be picked up in a launchpad 42. Those "hot areas" can be configured to have a "float on top" characteristic, i.e. they are always viewed in the foreground of the desktop, nevertheless they are active or not. The disadvantage of that solution is evident from FIG. 9 where the launchpad 42 is displayed together with the editor 50. Free accessibility of the active window 51 is substantially reduced by the area of the desktop reserved for the launchpad.

Figure 10:
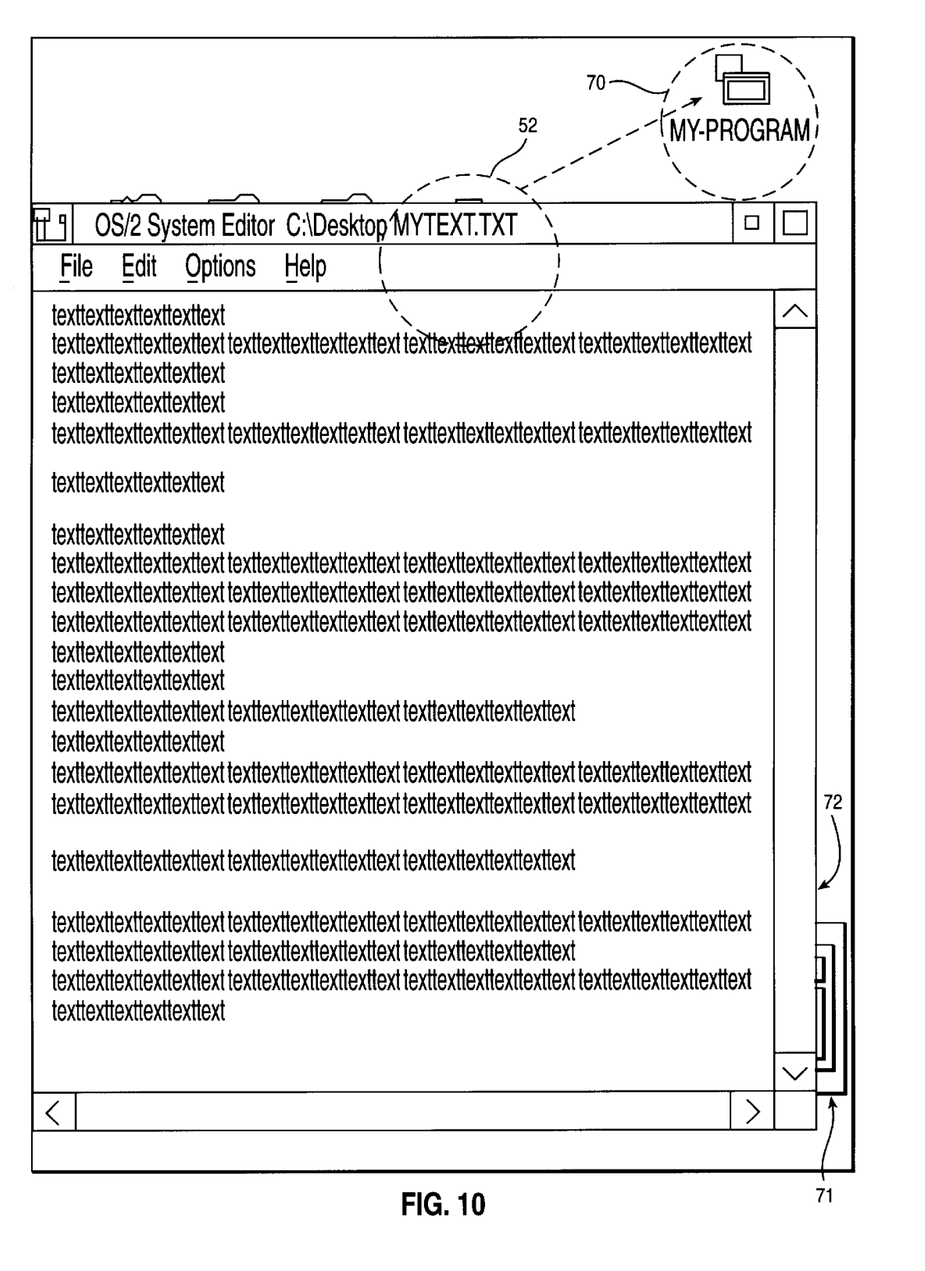

A preferred mode of operation for the invention is illustrated with reference to FIG. 10. The desktop object "MY-PROGRAM" 70 is now displayed at a non-hidden portion of the desktop at the right top. In this example it is assumed that the quadrant "I" of FIG. 3 has the highest priority for displaying that "hidden" icon. Thereupon the launchpad 71 for enabling a call-up of the icon "MY-PROGRAM" is no longer needed and thus can be displayed beneath the active window 72.

Figure 11:
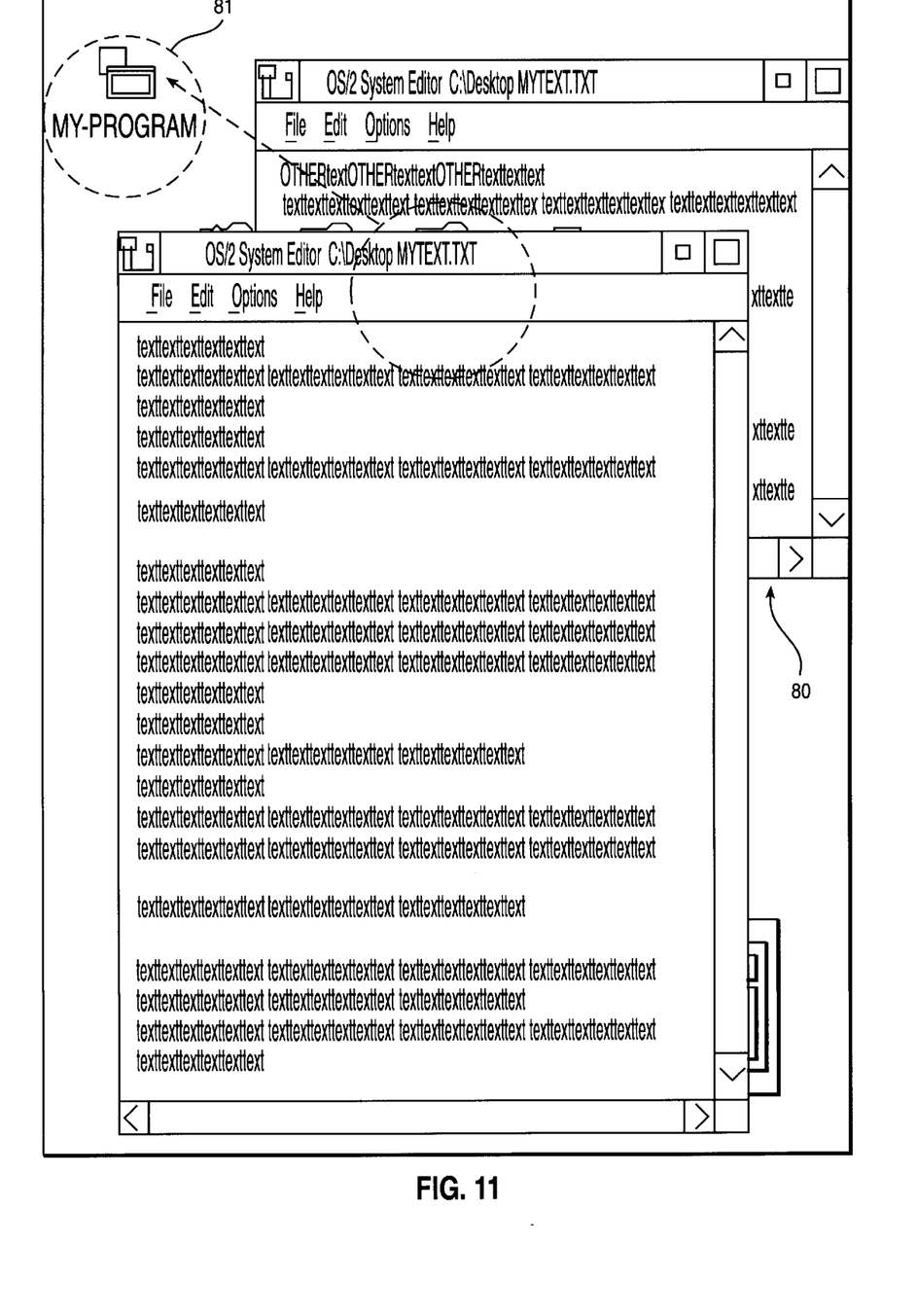

In case of quadrant "I" also being hidden beneath e.g. another window 80, the hidden icon 81 will be displayed at quadrant "II" at the top left side according to its succeeding priority. This behavior is shown by FIG. 11.

Figure 12:
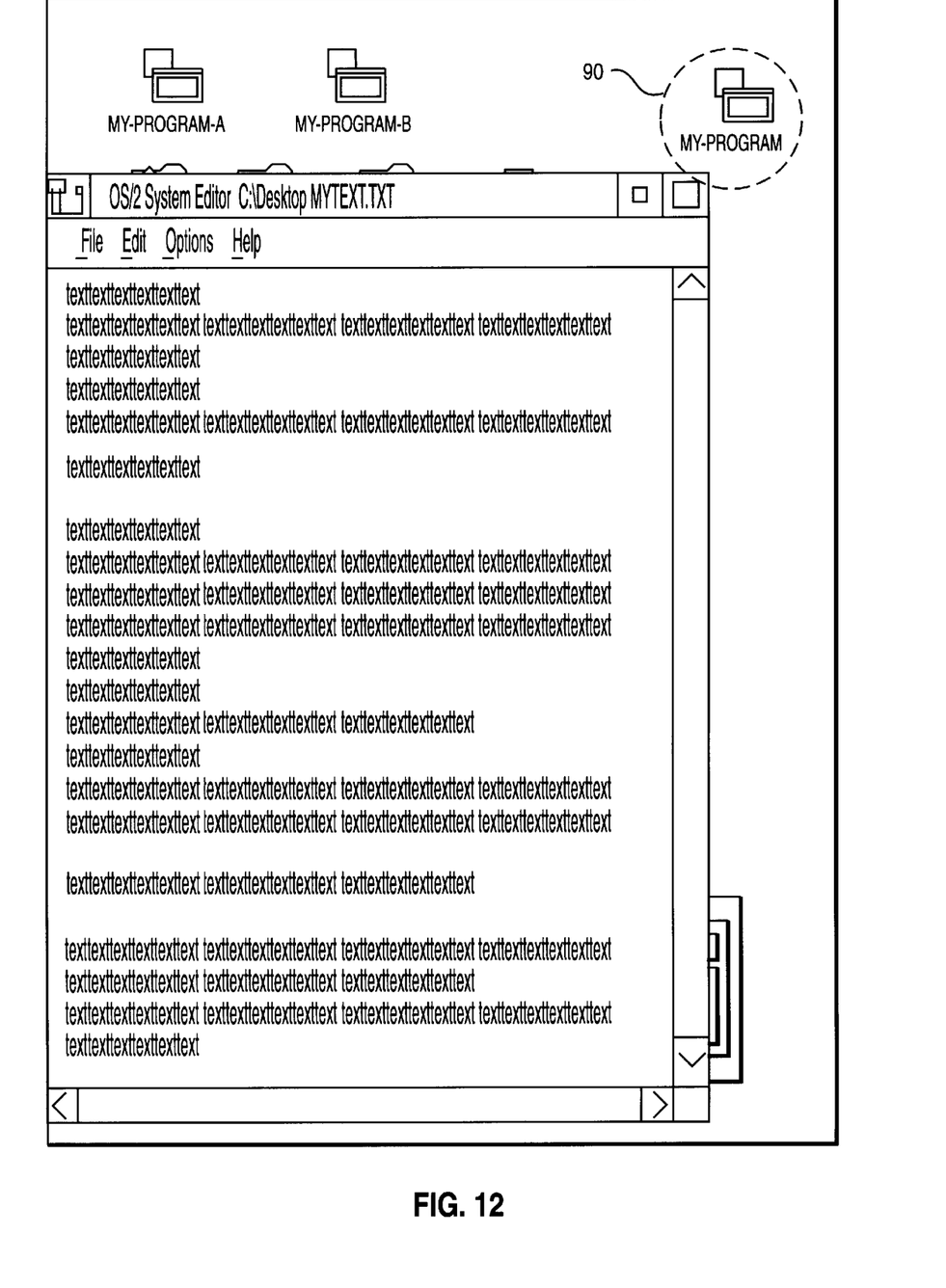
Figure 13:
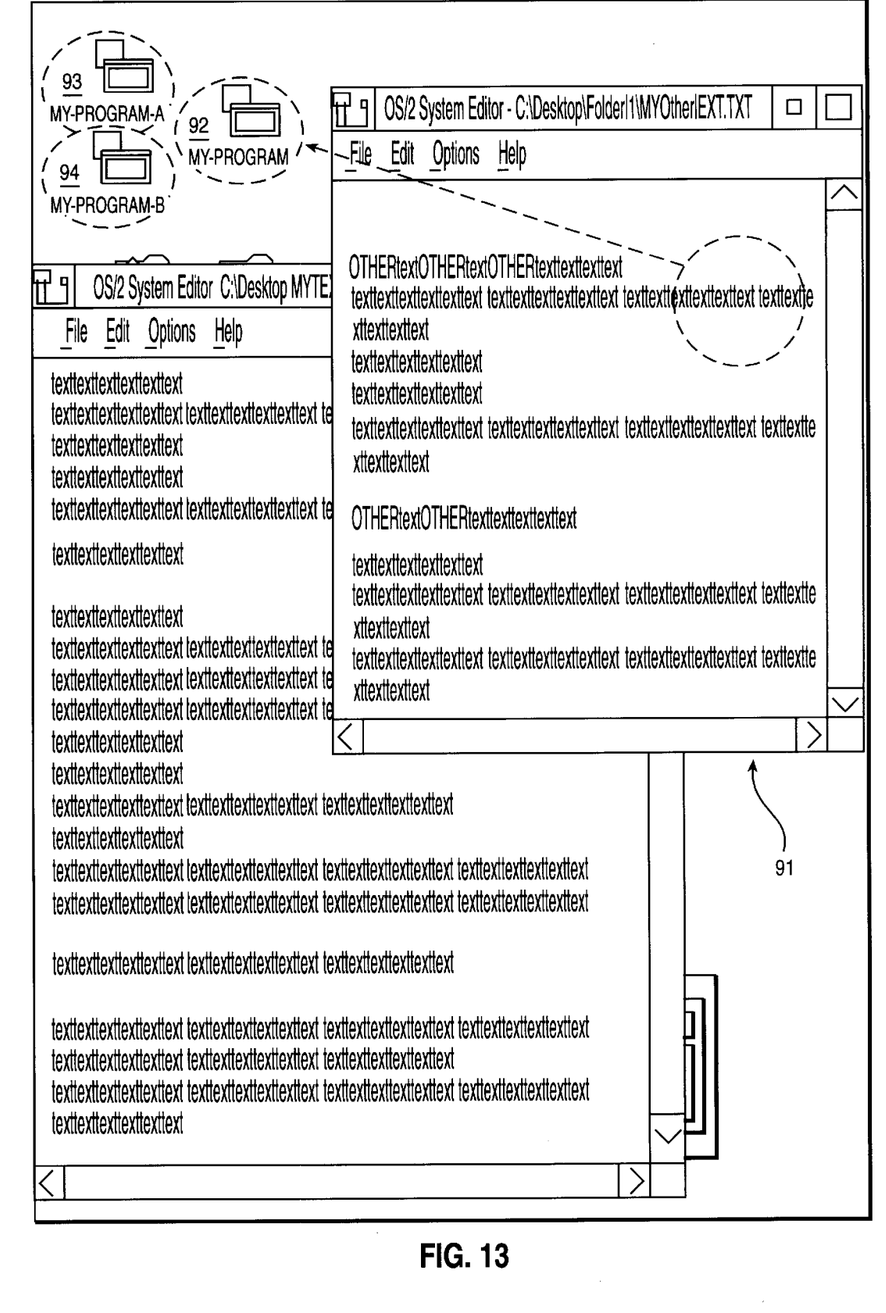

FIGS. 12 and 13 show an operation mode of the proposed control mechanism with regard to the optional icon diminution function. In FIG. 12 a scenario is shown where a previously hidden icon 90 has been already moved to a non-hidden portion at the right top of the desktop. In a next stage (FIG. 13) it is assumed that a further application window 91 has been activated which now covers the icon 90 thus the latter becoming hidden again. As in FIG. 11, it is assumed that quadrant "II" has the following priority after quadrant "I" and therefore the control mechanism tries to display the hidden icon 90 at that portion of the desktop. Since that portion is already occupied by two other icons 93, 94 the hidden icon 90 can not be displayed together with those icons without any overlap. Therefore the optional "icon resize" functionality as being part of the proposed mechanism becomes active and resizes all those icons 92–94 in order to get them displayed without overlaps.

I claim:

1. A method to control presentation of visual desktop objects in a graphical user interface of an information handling system, wherein the graphical user interface comprises at least two visual desktop objects, comprising the steps of:

identifying at least one desktop object which is at least partially visually hidden by at least one other desktop object, said identifying being performed continuously in the background of the graphical user interface;

determining a target area within a presentation space of said graphical user interface which does not include any desktop objects, said presentation space being divided into at least two partitions for visually non-hidden presentation of previously hidden desktop objects;

presenting said hidden desktop object in said target area which is a visually non-hidden portion of the graphical user interface by moving said hidden desktop object towards a visually non-hidden portion of the graphical user interface without altering the size of said hidden desktop object, said visually non-hidden portion of the graphical user interface being determined with respect to a user-defined specification;

said graphical user interface comprising at least one desktop object being a user's current focus (UCF) and at least one desktop object not being the user's current focus (NON-UCF);

identifying at least one NON-UCF desktop object being visually hidden by at least one other desktop object; and associating a different priority with each of said at least two partitions, wherein one of said at least two partitions is associated with a higher priority and is searched first to determine if said one of said at least two partitions includes an area at least as large as said target area, wherein said hidden desktop object is presented in said target area in said one of said at least two partitions if said one of said at least two partitions includes an area at least as large as said target area.

2. The method according to claim 1, further comprising in response to said one of said at least two partitions not including an area at least as large as said target area, searching said other of said at least two partitions to determine if said other of said at least two partitions includes an area at least as large as said target area, wherein said hidden desktop object is presented in said target area in said other of said at least two partitions if said other of said at least two partitions includes an area at least as large as said target area.

3. The method according to claim 2, wherein said movement of a hidden desktop object is visualized by a movement trace.

4. The method according to claim 3, wherein said movement of a visually hidden desktop object is visualized with respect to a shading factor or is performed non-visualized.

5. The method according to claim 4, further comprising in response to a hiding desktop object disappearing, said hidden desktop object being presented in a visually non-hidden portion of the graphical user interface remaining at its visually non-hidden position.

6. The method according to claim 4, further comprising:

in response to a hiding desktop object disappearing, said hidden desktop object being presented in a visually non-hidden portion of the graphical user interface icon being moved from its visually non-hidden position to its original, previously hidden position.

7. The method according to claim 1, wherein said at least one desktop object is a window, and wherein said step of presenting said hidden desktop object in said target area further includes presenting said hidden window in said target area.

8. A device to control presentation of visual desktop objects in a graphical user interface of an information handling system, wherein the graphical user interface without altering the size of said hidden desktop object comprises at least two visual desktop objects, comprising:

means for identifying at least one desktop object which is at least partially visually hidden by at least one other desktop object, said identifying being performed continuously in the background of the graphical user interface;

means for determining a target area within a presentation space of said graphical user interface which does not include any desktop objects, said presentation space being divided into at least two partitions for visually non-hidden presentation of previously hidden desktop objects;

means for presenting said hidden desktop object in said target area which is a visually non-hidden portion of the graphical user interface by moving said hidden desktop object towards a visually non-hidden portion of the graphical user interface, said visually non-hidden portion of the graphical user interface being determined with respect to a user-defined specification;

means for said graphical user interface comprising at least one desktop object being a user's current focus (UCF) and at least one desktop object not being the user's current focus (NON-UCF);

means for identifying at least one NON-UCF desktop object being visually hidden by at least one other desktop object; and means for associating a different priority with each of said at least two partitions, wherein one of said at least two partitions is associated with a higher priority and is searched first to determine if said one of said at least two partitions includes an area at least as large as said target area, wherein said hidden desktop object is presented in said target area in said one of said at least two partitions if said one of said at least two partitions includes an area at least as large as said target area.

9. The device according to claim 8, further comprising means responsive to said one of said at least two partitions not including an area at least as large as said target area, for searching said other of said at least two partitions to determine if said other of said at least two partitions includes an area at least as large as said target area, wherein said hidden desktop object is presented in said target area in said other of said at least two partitions if said other of said at least two partitions includes an area at least as large as said target area.

10. The device according to claim 9, wherein said movement of a hidden desktop object is visualized by a movement trace.

11. The device according to claim 10, wherein said movement of a visually hidden desktop object is visualized with respect to a shading factor or is performed non-visualized.

12. The device according to claim 11, further comprising means responsive to a hiding desktop object disappearing, for said hidden desktop object being presented in a visually non-hidden portion of the graphical user interface remaining at its visually non-hidden position.

13. The device according to claim 11, further comprising means responsive to a hiding desktop object disappearing, for said hidden desktop object being presented in a visually non-hidden portion of the graphical user interface icon being moved from its visually non-hidden position to its original, previously hidden position.

14. The device according to claim 8, wherein said at least one desktop object is a window, and wherein means for presenting said hidden desktop object in said target area further includes means for presenting said hidden window in said target area.

* * * * *